April 7, 1942.  C. I. MacNEIL  2,279,002
VALVE MECHANISM
Filed Jan. 14, 1941
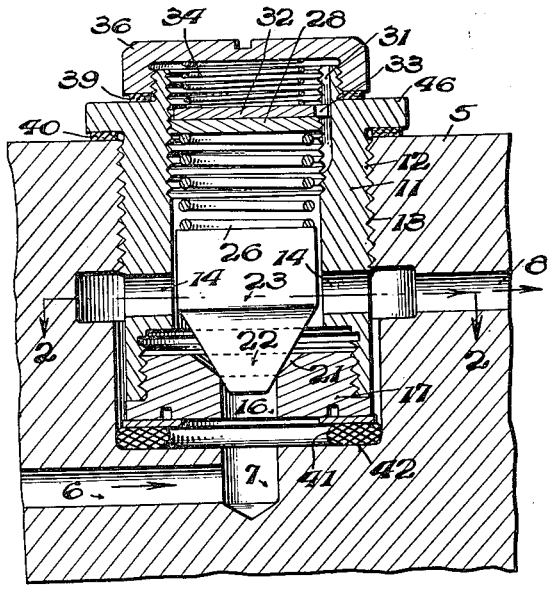
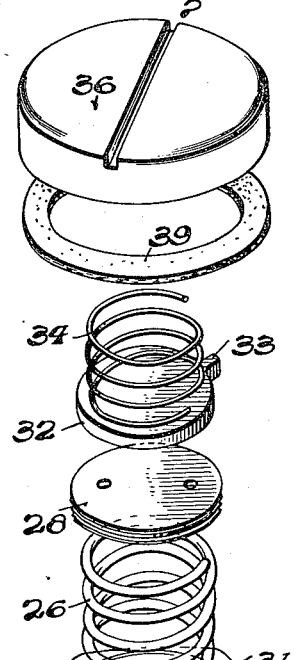
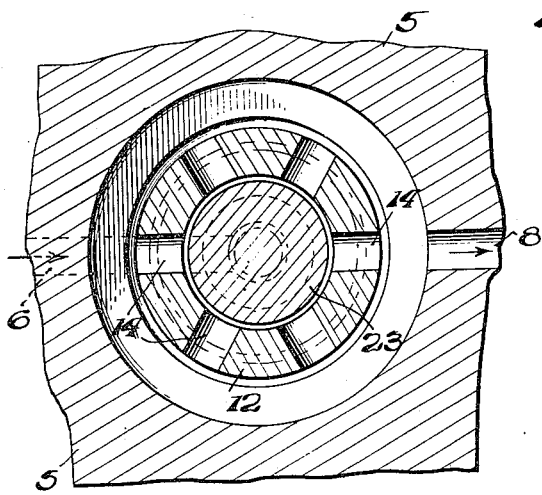
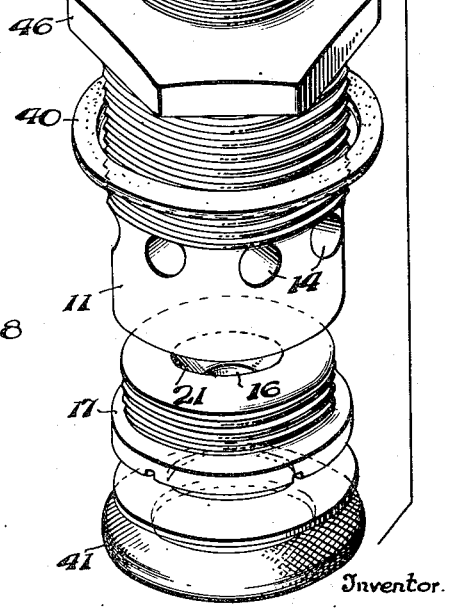
Inventor.
Charles I. MacNeil.
By Martin J. Finnegan Attorney Patented Apr. 7, 1942

2,279,002

UNITED STATES PATENT OFFICE 2,279,002

VALVE MECHANISM

Charles I. MacNeil, Glen Ridge, N. J., assignor to Bendix Aviation Corporation, South Bend, Ind., a corporation of Delaware Application January 14, 1941, Serial No. 374,397

1 Claim. (Cl. 251—145)

This invention relates to valve mechanism, and particularly to valve mechanism of the fluid pressure responsive type.

The general object is to provide an improved valve mechanism of the indicated type.

A specific object is to provide a novel form of valve mechanism having the property of being removable in one assembled entity, without disturbing the relationships between its component parts. As applied to a valve of the spring-seated, fluid-pressure opened, type, such as is shown in the accompanying drawing, the invention makes it possible to remove the valve assembly from its normal environment without disturbing the relationship of the valve head to its seat, wherefore the condition of said head and seat may be inspected, and any deviation from perfect seating relationship thereby detected most readily, and by direct view rather than by a process of deduction on conjecture, such as is necessary in the case of valves that are not correspondingly capable of being removed as a unit.

Other specific objects include providing novel means for sealing a valve, novel means for locking the valve seating spring in its desired setting, and novel means for protecting the valve from adulteration by extraneous elements.

These and other objects of the invention will become apparent from inspection of the following specification when read with reference to the accompanying drawing wherein is illustrated the preferred embodiment of the invention. It is to be expressly understood, however, that the drawing is for the purpose of illustration only, and is not designed as a definition of the limits of the invention, reference being had to the appended claim for this purpose.

In the drawing—

Fig. 1 is a longitudinal sectional view of the device embodying the invention;

Fig. 2 is a transverse sectional view along the line 2—2 of Fig. 1; and

Fig. 3 is an exploded perspective view of the assembly shown in Fig. 1.

Reference character 5 designates a part of the housing of an element of a fluid pressure system having a series of conduits 6, 7 and 8 through which fluid flow may occur upon creation of predetermined pressure conditions as controlled by the setting of the valve mechanism which is interposed between the conduits 7 and 8 as indicated best in Fig. 1. As shown, the valve mechanism includes an outer element 11 having a threaded portion 12 for engagement with corresponding threads 13 formed on the surface of an opening in the housing 5, which opening extends downwardly for a certain distance below the passage 8 in said housing and therefore controls the flow of fluid from the passage 7 to the passage 8. To effect this control, there is provided a series of lateral passages 14 in the outer element 11, and a centrally disposed passage 16 in the base member 17 which threadedly engages the lower end of the outer element 11; the said passage 16 being therefore in a position to register with the passage 7 in the housing 5. At its upper end, passage 16 flares outwardly to form a conical seat 21 for a correspondingly tapered head 22 of a valve element 23 which is disposed within the outer element 11 and is caused to remain normally in sealing relationship to the seat 21 by the pressure exerted thereupon by a coiled compression spring 26, the pressure of which is adjustable according to the position occupied by the spring compressing element 28. As shown, this element 28 is in the form of a disk whose periphery is threaded for engagement with a threaded inner wall of the outer element 11, and the novel means for holding this spring compressing element in the adjusted relationship comprises a longitudinally extending groove 31 cut through the threaded portion of the inner wall of the element 11 and a locking disk 32 having a radially extending tongue 33 engageable with said groove 31 and yieldably held in frictional contact with the upper surface of the disk 28 by the pressure of a second coiled spring 34 interposed between the member 32 and the internally threaded cap 36 which holds said spring 34 in place, and also acts as a means for applying pressure to the sealing element 39, as well as constituting a means for preventing access of extraneous matter to the interior of the valve. Two additional sealing elements 40 and 41 are interposed between the flange 46 and the housing 5 and between the base 17 of the valve assembly and the base 42 of the valve opening in the housing, respectively and pressure is applied to these sealing elements 40 and 41 as the valve assembly is screwed into place by the application of a suitable tool to the hexagonal flange 46 of the outer element 11.

With the foregoing construction, it will be apparent that the valve assembly may be removed as a unit without disturbing the relationship between the valve 23 and its seat 21, and therefore if there is any abnormal condition existing as, for example, an imperfect seating of the valve head due to the wedging of a piece of solid material at some point along the surface of the valve head or between said surface and the circular edge of the valve seat, the existence of such a condition may be observed instantly upon removal of the valve assembly. In this manner the person inspecting the valve will have positive assurance as to the source of trouble by reason of being able to observe the elements affected, and by reason of being able to make such observation in advance of any disturbance of the operating relationships between said elements. Moreover, should extraneous matter be found lodged between the seat 21 and the plunger 23 and it is not feasible to dislodge such subject matter by ordinary means, it is possible by unscrewing the lower portion 17 from the body 11 to achieve the disassembly of the inner elements of the valve—that is, those elements consisting of the plunger and main spring, clean the valve, remove the extraneous matter, and reassemble without disturbing the relationship of the disk 28 relative its position in the threaded chamber which is an index to the spring tension on the plunger. To recapitulate, the valve may be removed in toto for inspection and superficial cleaning without disturbing the valve or its setting, and it may be replaced by another valve which has been preset, without need of service test equipment at the time the interchange in valve elements are made. If foreign matter is found between the valve elements, which cannot be removed by ordinary means, the valve may be disassembled without changing the adjustment of the valve which is controlled by the tension on spring 34 at the time of initial setting.

In a modification of this valve the removable element 17 may be eliminated by making 17 and 11 in one piece, thereby lowering the cost of the product while still retaining all the advantages with the exception of being able to remove the valve seat 21 from the outer element 11 or to remove the plunger 22 through the lower end of the said outer element.

What is claimed is:

In a valve assembly, the combination, with a valve element, of a spring for applying pressure to said valve element, means for holding said spring in compressed condition, said holding means comprising an internally threaded housing for said spring and valve element, a spring compressing disk having its periphery threaded for engagement with said housing, and a locking disk having a radial extension for engagement with said housing in such manner as to prevent turning of either of said disks without manual intervention, and a means including a second spring for holding said two disks in frictional engagement.

CHARLES I. MacNEIL.